C. F. ROWE.
PNEUMATIC ACTION OF PIPE ORGANS.
APPLICATION FILED JULY 18, 1917.

1,285,396.

Patented Nov. 19, 1918.

Inventor:
Chas. F. Rowe

UNITED STATES PATENT OFFICE.

CHARLES F. ROWE, OF CHICAGO, ILLINOIS.

PNEUMATIC ACTION OF PIPE-ORGANS.

1,285,396.     Specification of Letters Patent.     Patented Nov. 19, 1918.

Application filed July 18, 1917. Serial No. 181,439.

*To all whom it may concern:*

Be it known that I, CHARLES F. ROWE, a citizen of the United States, residing at 228 West 60th Place, Chicago, in the county of Cook and the State of Illinois, have invented a new and useful Device, an Essential Part of the Pneumatic Action of Pipe-Organs, of which the following is a specification.

My invention relates to a device providing vent to the space between the two diaphragms of a double-faced diaphragm motor designed to operate the valve controlling the flow of wind (air under pressure) to the individual pipes of a pipe organ, or for any service where a diaphragm motor is required.

My object is to render the valve action noiseless and always positive with single wind pressure. This I do by employing two diaphragms on each motor, the space between them being always vented to the outside.

The accompanying drawing indicates the mechanism employed.

Similar numerals refer to similar parts in the several views.

Figure 1:
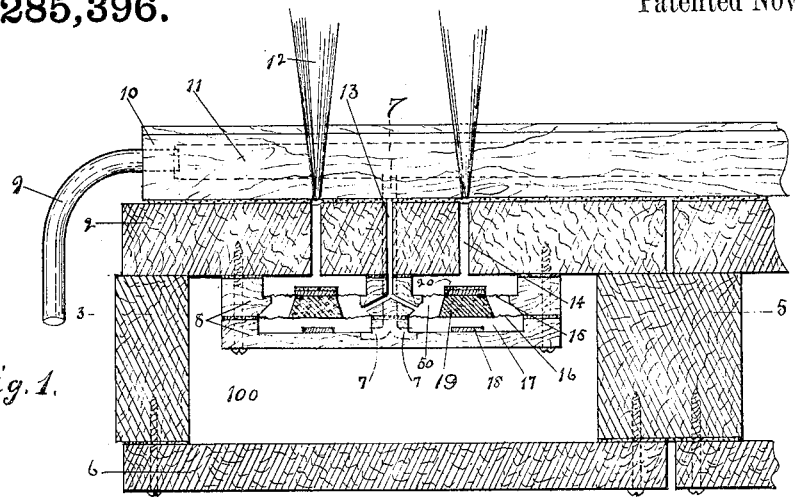
Figure 1 is a cross section, on line 1—1, Fig. 3, of a chest designed to conduct wind to one set of organ pipes.
Figure 2:
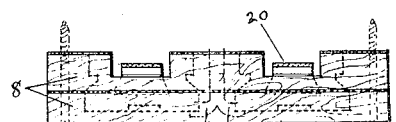
Fig. 2 is the elevation of the side of the valve block 8.
Figure 3:
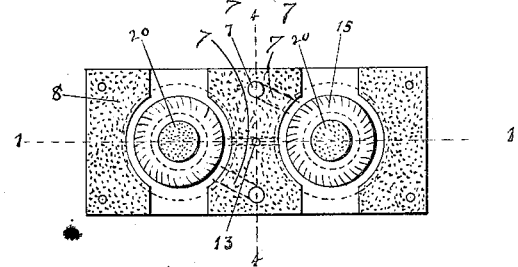
Fig. 3 shows the top face of the valve block.
Figure 4:
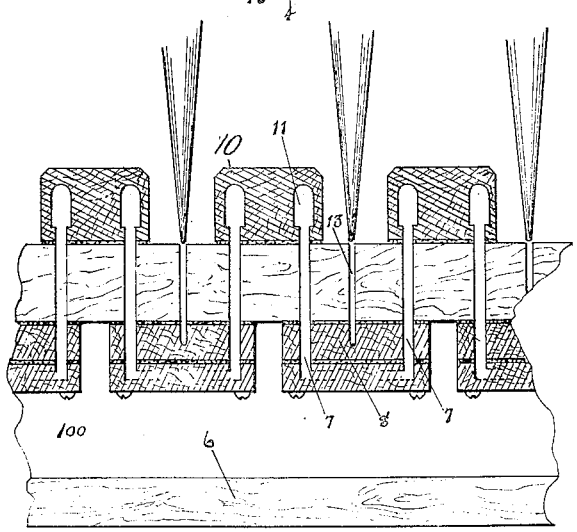
Fig. 4 is a longitudinal section of a chest on line 4—4, Fig. 3.

2 is the top-board of a chest.
3 is the outside wall or frame of a chest.
5 is the inside or partition frame of a chest.
6 is the bottom-board of a chest.
100 is the inside space of a chest.
8 is the valve block into which is built the motor operating the valve to each individual organ pipe.

The diaphragms 15 and 16 are separated by the block of cork 19 which carries the valve 20; the space around 19 and between 15 and 16 is always vented to the outside by the channel 13.

When the manual key is at rest, wind is admitted into 17 through the tube 9 and the channel 11 (in action bar 10) and the channel 7. Acting on the diaphragm 16 it raises the valve 20 against 2 to check the flow of wind through the channel 14 to the organ pipe 12.

When the manual key is depressed, the wind will escape from 17 and the valve 20 will be driven down by the wind in 100 acting on the diaphragm 15 and wind will be admitted through 14 to 12.

18 is a cushion to receive 19 when forced down.

I claim:

An organ pneumatic action comprising a wind chest and a motor therein carrying a pipe valve; said motor having two substantially parallel diaphragms of unequal size, the smaller one being always exposed on its outer side to air pressure in the chest, the pressure on the outer side of the larger one being controlled by a key; and means having a passage constantly venting the space between the diaphragms to the atmosphere.

CHAS. F. ROWE.

Witnesses:
   CHAS. B. ROWE,
   EDWARD L. SCOFIELD.